United States Patent [19]

Nishida

[11] Patent Number: 5,246,583
[45] Date of Patent: Sep. 21, 1993

[54] LIQUID TREATING APPARATUS

[76] Inventor: Tetsuo Nishida, 17-4, Shinkawa 5-chome, Mitaka-shi, Tokyo 181, Japan

[21] Appl. No.: 613,769
[22] PCT Filed: Oct. 11, 1990
[86] PCT No.: PCT/JP89/01043
 § 371 Date: Dec. 3, 1990
 § 102(e) Date: Dec. 3, 1990
[87] PCT Pub. No.: WO90/11813
 PCT Pub. Date: Oct. 18, 1990

[30] Foreign Application Priority Data

Apr. 6, 1989 [JP] Japan ................. 1-85738

[51] Int. Cl.⁵ .................. B01D 33/00; B01D 21/26
[52] U.S. Cl. ..................... 210/512.3; 209/211; 210/512.1
[58] Field of Search ............ 209/211; 210/512.1, 210/512.3, 321.68

[56] References Cited

U.S. PATENT DOCUMENTS

| | | | |
|---|---|---|---|
| 1,612,837 | 1/1927 | Schutz | 210/512.3 |
| 1,751,689 | 3/1930 | Enz et al. | 210/512.3 |
| 2,787,378 | 4/1957 | Battey | 210/512.3 |
| 4,277,334 | 7/1981 | Ruidisch et al. | 210/154 |
| 4,448,688 | 5/1984 | Havlis | 210/512.3 |
| 4,729,837 | 3/1988 | Heinricson | 210/512.3 |

FOREIGN PATENT DOCUMENTS

| | | |
|---|---|---|
| 0152846 | 8/1985 | European Pat. Off. |
| 1808243 | 6/1969 | Fed. Rep. of Germany |
| 2202192 | 7/1973 | Fed. Rep. of Germany |
| 3515958 | 11/1985 | Fed. Rep. of Germany |
| 45-829 | 1/1970 | Japan |
| 55-15243 | 4/1980 | Japan |
| 57-47043 | 10/1982 | Japan |
| 59-177105 | 10/1984 | Japan |
| 61-16044 | 5/1986 | Japan |
| 62-171720 | 7/1987 | Japan |
| 1-3453 | 1/1989 | Japan |
| 1327910 | 8/1987 | U.S.S.R. ................. 210/512.3 |
| 2148744 | 6/1985 | United Kingdom |

OTHER PUBLICATIONS

English Abstract of German Patent DE-A-2202192.

Primary Examiner—Robert A. Dawson
Assistant Examiner—Sun Uk Kim
Attorney, Agent, or Firm—Klauber & Jackson

[57] ABSTRACT

An apparatus for the continuous treatment of liquids such as rainwater, sewage and drainage, comprised of a rotary separator having a centrally located freely rotating cylinder which creates positively and forcibly a circular flow of liquid within the rotary separator different from the circular flow of the liquid caused by its being charged within the separator. Solid and suspended materials in the liquid are drawn to the center of the separator for removal and containment within a reservoir respectively. The reservoir, for collection of suspended material, is formed as part of the rotating cylinder. The apparatus further may comprise a holder-separator for entrapping floating substances.

1 Claim, 9 Drawing Sheets

LIQUID TREATING APPARATUS

FIELD OF ART

This invention relates to liquid treating apparatuses for treating liquids containing crude refuse and other suspended matters (including oils) and/or sediment, other solid materials, and the like (such liquids hereinafter will be simply referred to as "liquid" as the case may be) to separate the crude refuse, the suspended matters, the sediment, and the solid matters and to remove them from the liquid for preparing cleaned water having a specified water-quality for discharge. Such liquids include, for example, clean water originated from river surface water as a water source, rain water appeared in the city areas when it rains, sewage or drainage caused by human living, and industrial effluent. The present invention also relates to continuous liquid treating arrangements including these apparatuses and methods for continuous liquid treatment using these arrangements.

BACKGROUND ART

Generally, a sand basin, a sedimentation basin, screening equipment, or the like has conventionally been adopted for removal of suspended matters and/or sediment contained in liquid.

In a system using the sand basin where the sand tends to involve a large amount of organic substances, the sand used may be treated by means of sand-lifting or sand-washing to separate such organic substances therefrom. However, the these means for the separation; is unacceptable with the use of complicated and costly mechanical means. The sedimentation basin to be used in a waste water treatment system will require a large area thereof for the removal of, particularly, substances of a low specific gravity and additionally a complex and costly mechanical means for the removal. With a system using the screening equipment, screens having various openings must be provided for removing suspended matters of various sizes, e.g. microscopic matters, coarse matters, and these screens must be exchanged as the occasion demands. Such frequent and complex work for the exchange is, however, impractical.

In view of the foregoing, the present inventor has proposed an arrangement where liquid subject to treatment is caused to create a circular flow thereof to settle sedimentary substances for removal by making use of their hydraulic characteristics (disclosed, for example, in Japanese Patent Laid-open No. 171,718/1987). The present inventor has proposed another arrangement including a baffle plate within a processing vessel to restrain the surface flow of liquid circular flow and an overflow spout located on a side wall of the vessel at the upstream side of the baffle plate, to restrain the migration of suspended matters and/or organic substances carried by the surface flow of the liquid and to withdraw them from the overflow spout (disclosed, for example, in Japanese Patent Laid-open Patent No. 144,895/1988). With such arrangements utilizing the hydraulic characteristics of the suspended matters, organic substances, and sediment, the suspended matters and organic substances are floated and the sediment is settled so that they may be withdrawn respectively in an efficient manner. However, liquids such as clean water originated from river surface water as a water source, rain water appeared in city areas when it rains, sewage or drainage caused by human living, and industrial effluent, sometimes include a lot of crude refuse and suspended matters or sediment and solid materials, or both, when high rainfall flashes (these crude refuse and suspended matters will be hereinafter simply designated as "suspended matter", and these sediment and solid matters will be hereinafter simply as "sediment", as the case may be). It has been therefore desired to develop equipment and a treating method for removing such a lot of suspended matters or sediment, or both from liquid in more efficient manner, temporarily storing these waste which may, as a consequence, be released if necessary, and providing facilities for cleaning of a storing zone in spite of these conditions.

DISCLOSURE OF THE INVENTION

Accordingly, an object of the present invention is to provide a liquid treating apparatus for settling solid materials for separation by circulating liquid within a separator of free charge and discharge of the liquid subject to treatment, comprising in the center of said separator a rotating cylinder defining a reservoir for collecting suspended matters, said rotating cylinder which is freely revolved generating a strong eddy flow in the central zone of said separator by the revolving action thereof to create a reduced pressure, thereby settling said solid materials for separation and providing the suspended matters and other except for liquid with centripetal force. Said separator causing the liquid with centripetal force. Said separator causing the liquid to rotate therein will be hereinafter designated as "rotary separator".

The liquid treating apparatus using this rotary separator is, so to speak, a type in which a separator is combined with a rotating cylinder creating forcibly and positively a circular flow of liquid in the separator. The rotating cylinder is provided with the reservoir formed as a part thereof or on a side wall of the separator for removing with high efficiency the suspended matters or organic substances, or both which are carried by the surface flow of a rolling circulation of the liquid. Also, the sediment is settled and accumulated in the bottom of the separator by the positive and forced circular flow of the liquid and a secondary flow, and thus they may be removed with high efficiency.

Also, the present invention is directed to another special liquid treating apparatus developed for collecting influent suspended matters by making use of a flow of liquid. The special liquid treating apparatus may be easily combined with the first liquid treating apparatus previously explained, although it may be used as an independent arrangement. Concretely, the apparatus is provided with a holder-separator of free charge and discharge of the liquid subject to treatment, comprising a shelf-like trap for collecting the suspended matters and an overflow weir, wherein said shelf-like trap is disposed with its opening portion opposite to the direction of the liquid flow, and said overflow weir may be either invariable or adjustable with respect to height and is disposed at the exit portion of said holder-separator above a shelf part of the trap to control a liquid level.

Further, still another special liquid treating apparatus is developed in this invention. This apparatus serves as a reservoir and has functions as a separator for separating the settled and precipitated sediment and suspended matters for removal from supernatant purified water. Independent use of this treating apparatus may be permitted. To be concrete, the liquid treating apparatus is provided with a reservoir-separator of free charge and discharge of the liquid subject to treatment. This reservoir-separator includes a bottom which slopes downwardly from an entrance portion toward an exit portion, comprising projecting conductive and dividing walls formed on the entire surface of the bottom for cleaning and directing the suspended matters precipitated or sediment settled on the bottom of the reservoir-separator and a well in the lowermost portion of the bottom for easy evacuation of the sediment and suspended matters.

The present invention is also directed to continuous liquid treating arrangements where the aforementioned three liquid treating apparatuses are arbitrarily and selectively combined, thereby performing various treatments for separation according to processing conditions such as a content of suspended matters or sediment in liquid and an amount of liquid.

By using a continuous liquid treating arrangement constituted of, for example, the liquid treatment apparatus with the rotary separator in combination with other two apparatuses, various continuous treatments may be performed according to processing conditions such as a content of suspended matters or sediment in liquid and an amount of liquid. In the liquid treating apparatus using the holder-separator, the shelf-like trap for collecting suspended matters is disposed with its opening portion opposite to the direction of a liquid flow so that the influent suspended matters in liquid may be carrie by liquid streams and automatically collected in the trap. Additionally, by disposing the overflow weir for controlling a liquid level at the discharge portion of the holder-separator above the shelf part, a well-controlled level of remained suspended matters in the separator will be expected. In addition, the height of the weir may be adjusted according to changes in the liquid level.

In the liquid treating apparatus comprising the reservoir-separator of free charge and discharge of the liquid subject to treatment, the reservoir-separator includes the bottom which slopes downwardly from an entrance portion toward an exit portion and projecting conductive and dividing walls formed on the entire surface of the bottom for cleaning and directing the suspended matters or sediment precipitated on the bottom of the reservoir-separator. Also, the well is formed in the lowermost portion of the bottom for easy evacuation of the sediment and suspended matters. The liquid may be stored for a desired period of time, and the suspended matters or the sediment may be removed at adequate time for treatment.

The sediment and suspended matters settled or precipitated while stored are readily removed from the well, and those attached to the bottom of the separator can be swept away without difficulties by clean water fed from the entrance portion because of the devised structure of the separator where the bottom slopes downwardly and the projecting conductive and dividing walls are formed on the entire surface of the bottom. A cleaning operation of the reservoir-separator is thus performed with ease.

Methods for continuous liquid treatment are now explained.

First Method for Continuous Liquid Treatment

Liquid is first directed to the liquid treating apparatus with the rotary separator. By the revolving action of the rotating cylinder, suspended matters are collected in the reservoir for collecting suspended matters and withdrawn from the separator. Sediment and solid materials are collected in the central portion of the separator bottom and withdrawn from the separator by a pump means.

The treated liquid is thence directed to the liquid treating apparatus with the holder-separator. After separating crude refuse and suspended matters from the liquid through the shelf-like trap, the resultant liquid is discharged.

The suspended matters collected in the suspended matter-collecting reservoir of the above rotating cylinder and withdrawn is thereafter disposed of as it is or transferred together with the treated liquid to the liquid treating apparatus with the reservoir-separator.

The suspended matters separated and withdrawn through the shell-like trap is disposed of as it is or directed together with the treated liquid to the liquid treating apparatus with the reservoir-separator.

In this liquid treating apparatus with the reservoir separator, an influent is temporarily stored, and sediment and other solid materials and suspended matters are precipitated. Supernatant purified water is discharged, while the sediment and other solid materials and suspended matters are withdrawn by a pump means and disposed of. The first continuous liquid treating is thus accomplished. This continuous treatment of liquid is preferably used for treating liquid involving a large amount of suspended matters.

Second Method for Continuous Liquid Treatment

Liquid is first directed to the liquid treating apparatus with the holder-separator. Crude refuse and suspended matters are separated through the shelf-like trap.

The treated liquid is thence directed to the liquid treating apparatus with the reservoir-separator where sediment and other solid materials are settled. Supernatant purified water is discharged, while the settled sediment and other solid materials are withdrawn by a pump means for disposal or;

further directed to the liquid treating apparatus with the rotary separator, collected in the central portion of the separator bottom by the revolving action of the rotating cylinder and withdrawn from the separator by a pump means. The second continuous liquid treating is thus accomplished. The use of this continuous treatment of liquid is desirable for treating liquid involving a large amount of sediment or a large amount of rain water.

Third Method for Continuous Liquid Treatment

Liquid is first directed to the liquid treating apparatus with the holder-separator. Crude refuse and suspended matters are separated through the shelf-like trap.

The treated liquid is thence directed to the liquid treating apparatus with the rotary separator. Suspended matters are collected in the suspended matter-collecting reservoir by the revolving action of the rotating cylinder and withdrawn from the separator. Sediment and solid materials are collected in the central portion of the separator bottom and withdrawn from the separator by a pump means, while supernatant purified water is discharged. The third continuous liquid treating is thus accomplished. The use of this continuous liquid treatment is desirable for separating suspended matters and sediment independently.

BEST MODE FOR CARRYING OUT THE INVENTION

Examples in preferred form of the present invention are now explained according to the drawings.

With reference to FIG. 1 to FIG. 4, first, a liquid treating apparatus A using a rotary separator will be illustrated.

In the drawings, the number 1 represents a rotary separator including a side wall 2 having almost a circular shape. The number 3 stands for an entrance portion disposed in a specified position of side wall 2 of rotary separator 1 to direct liquid 4 from an almost tangential direction to rotary separator 1. Since liquid 4 is directed to rotary separator 1 from a tangential direction, it is forcedly circulated as a circular flow 5. Sediment 6 involved in liquid 4 is settled and separated while it is circulated and it is accumulated in the central portion of a bottom 7 of rotary separator 1. Bottom 7 is provided with a concave sediment well 20 with an opening end of a discharge pipe 21 for easy withdrawal of sediment from rotary separator 1. The other end of discharge pipe 21 may be connected with a reservoir-separator 34 later-explained or a conventionally known solid-liquid separator using a cyclone (now shown). The number 8 represents an exit portion through which treated liquid 22 is withdrawn from rotary separator 1. Entrance portion 3 and exit portion 8 are each formed as a gate adjustable with respect to opening and closing. In the central section of rotary separator 1, there is provided a rotating cylinder 9 defining a reservoir 13 for collecting suspended matters. Rotary cylinder 9 including a bottom and a rotary shaft 23 mechanically connected to a motor 11 as a driving source through a flexible universal joint 10. Cylinder 9 driven by motor 11 is revolved positively and forcedly to make a large difference in a rotating speed between the central portion and peripheral portions of circular flow 5, thereby promoting the creation of a secondary flow 12 heading vertically (downward) toward the center to effect settling and accumulation of sediment 6. A strong eddy current is produced in the central portion of the separator to create a reduced pressure and to provide suspended matters and others except for the liquid in the separator with centripetal force. In the surface area of circular flow 5, the centripetal force is created by the revolution of rotating cylinder 9, resulting in occurrence of a surface flow as shown by an arrow X in FIG. 3.

Figures 3, 4:
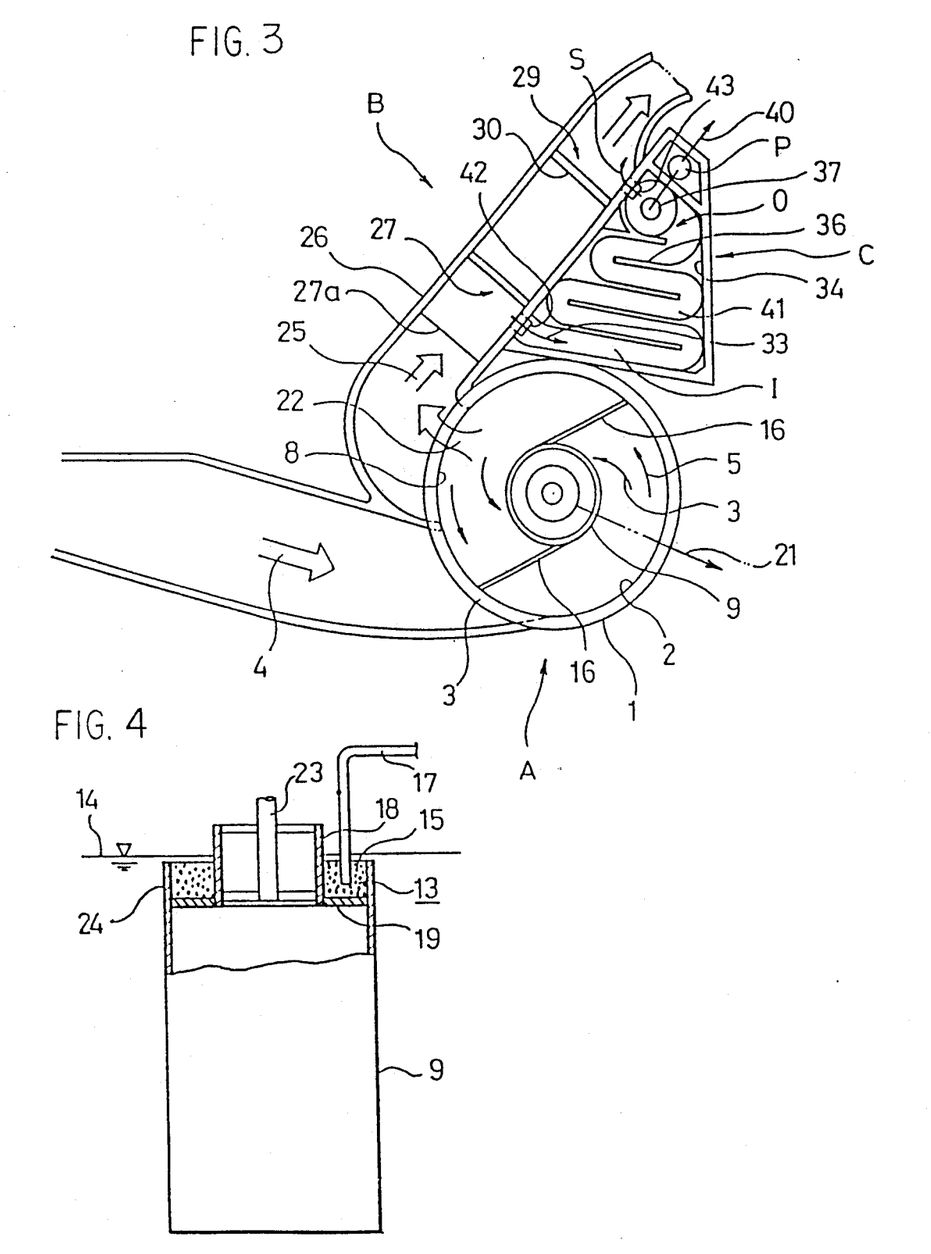
FIG. 3 shows a plan view for schematically explaining an overall arrangement based on FIG. 2.
FIG. 4 shows a side view, a major part broken away, of a rotating cylinder.

Suspended matter-collecting reservoir 13 is located in the upper portion of rotating cylinder 9 at a slightly lower position of level 14 for facilitating collection of suspended matters and organic substances 15. In more detail, reservoir 13 is formed as a compartment enclosed by a cylindrical dividing part 24, a dividing cylinder 18, and a dividing wall 19. Dividing cylinder 18 having a smaller diameter than that rotating cylinder 9 is disposed inside cylindrical dividing part 24 which is formed projecting from the top of rotating cylinder 9. Dividing 18 and cylindrical dividing part 24 are spaced apart and secured to dividing wall 19 which is horizontally placed.

Figure 2:
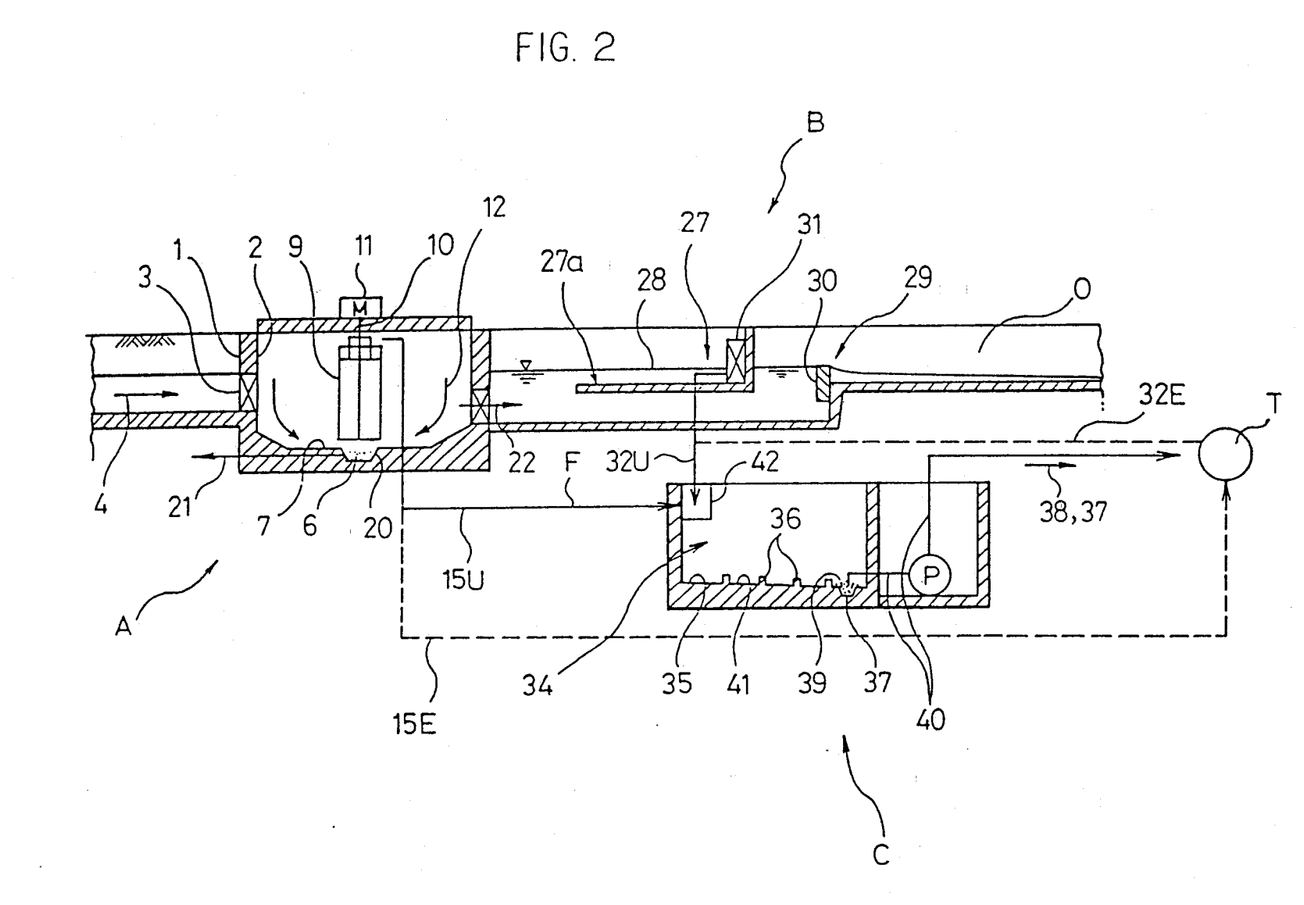
FIG. 2 shows a sectional view of an overall arrangement for schematically explaining the connecting condition of each liquid treating apparatus used for a first continuous liquid treatment.

The number 16 stands for a conductive plate which varies the surface flow of circular flow 5 more effectively. Conductive plate 16 is located with the lower end thereof slightly below level 14, forming a slope for directing the surface flow of circular flow 5 toward rotating cylinder 9 and formed of spaced apart two sheets disposed between rotating cylinder 9 and side wall 2. By these measures, suspended matter 15 floated on the liquid level can smoothly be introduced into suspended matter-collecting reservoir 13.

The number 17 indicates a suspended matter-sucking pipe which includes an opening end communicating with suspended matter-collecting reservoir 13 to evacuate suspended matter 15 retained in reservoir 13 for removing it therefrom.

Additionally, the shape and structure of suspended matter-collecting reservoir 13 are not limited to those shown in the drawings. A dividing body having an inverse skirt shape may be formed in the upper portion of rotating cylinder 9.

Further, while now shown, a suspended matter-collecting reservoir may be formed alternatively on a side wall of rotary separator 1, but not in rotating cylinder 9. For example, it may be appreciated to locate the suspended matter-collecting reservoir on an external wall of the rotary separator 1, with its opening disposed in a position corresponding to the level of liquid in the separator, in combination with a conductive plate disposed in contact with the liquid level for conducting the suspended matters floated on the level to the suspended matter-collecting reservoir.

With the liquid treating apparatus A having the configuration above-described wherein liquid 4 fed from entrance portion 3 to rotary separator 1 is forcedly circulated as circular flow 5, and the secondary flow is generated while the liquid is forcedly and positively circulated by the revolution of rotating cylinder 9, the sediment in liquid 4 is effectively settled and separated from the liquid by a combined effect of circular flow 5 and secondary flow, collected in sediment well 20 formed in the central position of bottom 7 of rotary separator 1, withdrawn from well 20, and removed from rotary separator 1 via pipe 21 having an open end communicating with sediment well 20 for evacuating the sediment. While, with the aid of conductive plate 16, the surface current of circular flow 5 directed toward rotating cylinder 9 by the revolution of rotating cylinder 9 acts to collect the suspended matters carried by the surface flow. The suspended matters and organic substances are caused to enter suspended matter-collecting reservoir 13 consequently and thence evacuated and removed from the separator via sucking pipe 17 while staying in reservoir 13.

Figure 1:
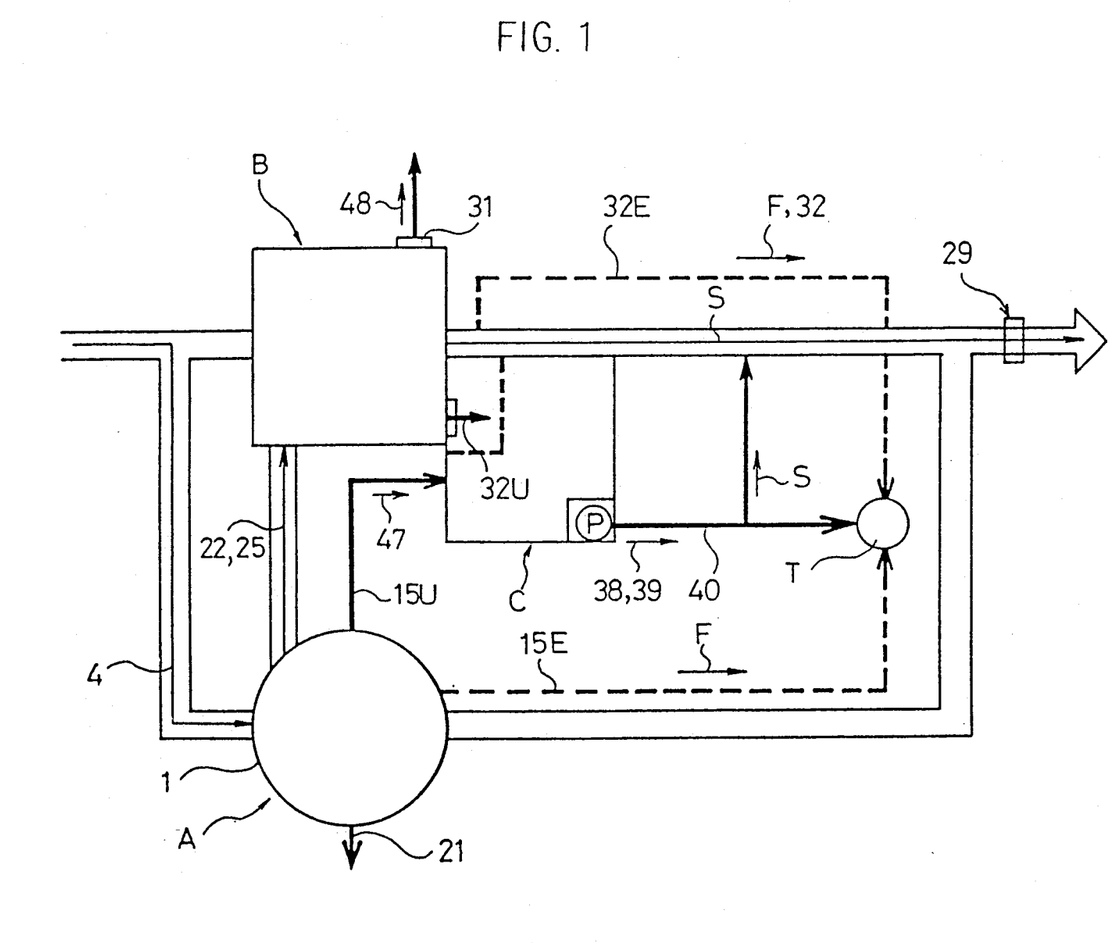
FIG. 1 shows a general process diagram for explaining first continuous liquid treatment.

Referring to FIG. 1 to FIG. 3, another liquid treating apparatus B will be explained.

The liquid treating apparatus B has a U-shape in section and includes a holder-separator 26 of free charge and discharge of liquid 25 (or liquid 22 from which suspended matters, organic substances, and sediment where primarily removed, in the case where the apparatus B is connected with the above-mentioned rotary separator 1 as shown in a continuous liquid treating arrangement later-explained). Holder-separator 26 is provided with a shelf-like trap 27 for collecting suspended matters. Shelf-like trap 27 is disposed with its opening portion opposite to the direction of a flow of liquid 25. Holder-separator 26 is also provided with an overflow weir 29. Overflow weir 29 is located at an exit portion O of holder-separator 26 above a shelf part 27a of shelf-like trap 27 to adjust the height of a liquid level 28. Overflow weir 29 is adjustable to height, including an adjustable weir plate 30. A gate 31 capable of opening and closing is provided in the backmost part of suspended matter-collecting shelf-like trap 27 to facilitate removal of suspended matter 32 therefrom.

Additionally, gate 31 may be connected with a gate 42 located in an entrance portion I of a reservoir-separator 34.

With liquid treating apparatus B, liquid 25 flows to exit portion O from entrance portion I while suspended matter 32 floated on liquid level 28 is carried by the flow to enter suspended matter-trap 27 where suspended matter 32 is entrapped as if it were scraped up. Suspended matter 32 collected there is externally removed from holder-separator 26 through gate 31 with ease. During the above proceeding, weir plate 30 adjust the height of liquid level 28 in such a manner that the surface current of liquid 25 is above shelf part 27a of holder-separator 27.

Stated additionally, liquid 25 from which suspended matter 32 has been separated is discharged or withdrawn from exit portion over weir plate 30.

Referring to FIG. 1 to FIG. 3, still another liquid treating apparatus C will be illustrated.

Liquid treating apparatus C is provided with a reservoir-separator 34 of free charge and discharge of liquid 33 subject to treatment. The reservoir-separator includes a bottom which gently slopes and projecting conductive and dividing walls 36 formed on the entire surface of the bottom 35 between an entrance portion I and exit portion O of reservoir-separator 34 for cleaning and directing the suspended matters precipitated or sediment settled on the bottom 35. As shown in FIG. 3, these conductive and dividing walls 36 are disposed at an adequate interval from each other and respectively formed in a shape like a meandering line depicted on a plane. The top of the line is entrance portion I and the end of the line is exit portion O. Gates 42 and 43 adjustable with respect to closing and opening are located in entrance portion I and exit portion O respectively.

It is to be understood that gate 43 may be connected to the aforementioned exit portion O of holder-separator 26.

In the lowermost portion of bottom 35, a well 37 is formed for easy evacuation of the sediment, suspended matters, and the like and an open end of a sucking pipe 40 is formed for evacuating suspended matter 38 and/or sediment 39. A symbol P stands for a pump connected with pipe 40. A plurality of indentations (not shown) may be formed on bottom areas 41 partitioned by conductive and dividing walls 36 within the area of bottom 35.

With this liquid treating apparatus C, when liquid 33 is introduced from entrance portion I, reservoir-separator 34 is filled with suspended matter 38 and/or sediment 39 together with liquid 33 having a quantity corresponding to a charge rate of liquid 33. In the course of settling and precipitating of sediment 39 and/or suspended matter 38, a supernatant is withdrawn as purified water S for discharge, while sediment 39 and/or suspended matter 38 are withdrawn from the separator via pipe 40 and a pump means. As for bottom 35 of reservoir-separator 34, the suspended matter may attach thereto and/or the settled and precipitated sediment or the like may be accumulated thereon. However, reservoir separator 34 can be cleaned with ease by flowing cleaning water 47 from entrance gate 42 because the attached suspended matters are released and the accumulated sediment is washed away by a forced flow of cleaning liquid 47 which is accelerated between conductive and dividing walls 36. In this case, if the plurality of indentations (not shown) is formed on bottom areas 41 partitioned by conductive and dividing walls 36 within the area of bottom 35, the flow of the cleaning water is caused to grow as a turbulent flow to float up the sediment accumulated on the bottom and thereby to wash them away with ease.

Figure 7:
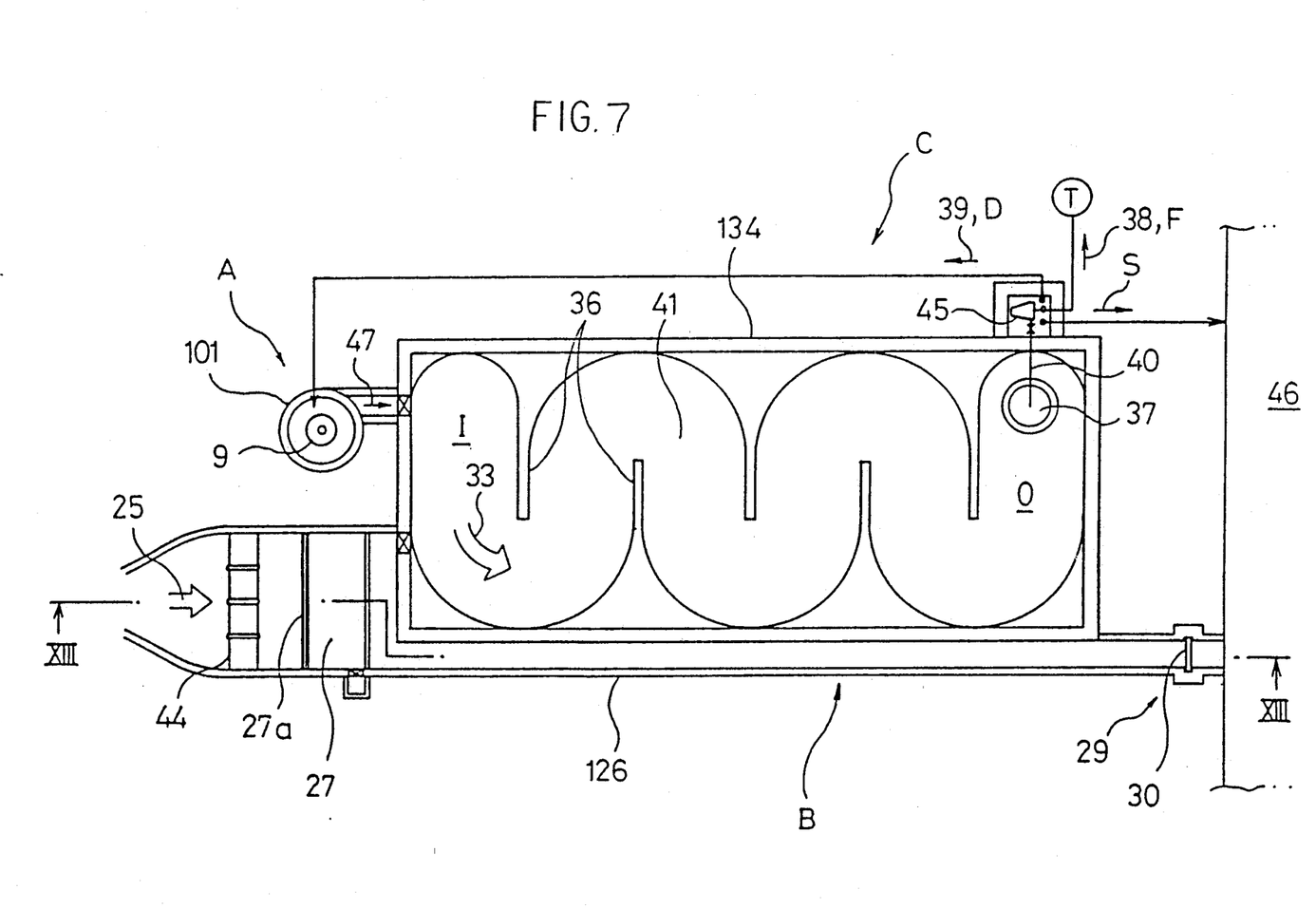
FIG. 7 shows a plan view for schematically explaining an overall arrangement based on FIG. 5.
Figure 8:
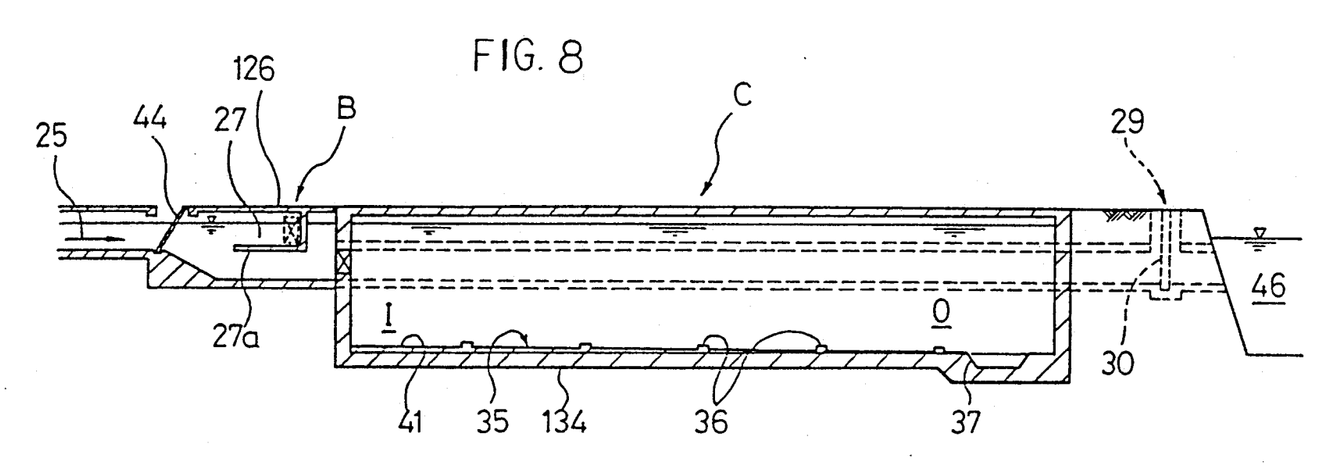
FIG. 8 shows a sectional view taken along an arrow line VIII—VIII in FIG. 7.

FIG. 7 and FIG. 8 illustrate another holder-separator 126 combined another rotary separator 101 and another reservoir-separator 134. Although these separators are different in shape from each of corresponding separators explained before, e.g. holder-separator 26, rotary separator 1, reservoir-separator 34, the corresponding apparatuses have fundamentally the same structure. Therefore, identical reference numbers are used to identify components similar to those used in the foregoing apparatuses and the same description is not repeated, while fresh numbers are used to identify different and additional components and their features will be explained. The number 44 stands for a screen for separation of crude refuse. The number 45 represents a series of pumps for discharge or disposition of purified water S, withdrawal of sediment D or suspended matter F, or transfer of sediment D to the rotary separator 110. The number 46 indicates a river.

It is to be understood that the shape and size of rotary separators 1, 101, holder separators 26, 126, and reservoir separators 34, 134 are not limited to those illustrated in the drawings, and that various changes may be made in the shape and size of these units depending on their locations or treating conditions of liquid. For example, while not shown, a modification of the reservoir separator may be provided. The modification has a circular shape as a plan view and includes a bottom which slopes downwardly from the peripheral end thereof toward its central portion and also includes spiral conductive and dividing walls.

Arrangements for continuous liquid treatment and methods for continuous liquid treatment are now explained.

Generally, these arrangements for continuous liquid treatment are those including liquid treating apparatuses A, B, and C which are combined and selectively connected. The methods for continuous liquid treatment of this invention are those for treatment using these arrangements. The constitutional units of the arrangements for continuous liquid treatment are liquid treating apparatuses, A, B, and C. Thus, illustrations of each constitutional unit are omitted, and combining and connecting manner of the constitutional units A, B, and C will be primarily illustrated. Because illustrations for the foregoing arrangements for continuous liquid treatment are common in many parts with those for methods for continuous liquid treatment, major parts of illustrations will be for methods for continuous liquid treatment to avoid repetitious illustrations.

First Continuous Liquid Treatment

With reference to FIG. 1 to FIG. 4, a first continuous liquid treatment and its method for continuous liquid treatment will be explained. Liquid treating apparatus A with rotary separator 1 and liquid treating apparatus B with holder-separator 26 are combined in this order and to this combination is supplemented liquid treating apparatus C with reservoir separator 34 to constitute the first arrangement for continuous liquid treatment.

Liquid 4 can be treated according to the following method for continuous treatment using this arrangement for continuous liquid treatment.

Liquid 4 is first introduced to liquid treating apparatus A with rotary separator 1. With rotating cylinder 9 being rotated, suspended matter 15 is collected in suspended matter-collecting reservoir 13 and is withdrawn therefrom via sucking pipe 17, while sediment 6 is collected in sediment well 20 positioned in the central portion of the bottom 7 of the separator and is withdrawn therefrom via pipe 21 for evacuation of the sediment. Suspended matter 15 withdrawn through pipe 17 is transferred as shown by a dashed line 15E for treatment T (simple treatment), e.g. disposal, or transferred to reservoir separator 34 as shown by a continuous line 15U for additional treatment thereto (general treatment).

Next, liquid 22 is introduced to liquid treating apparatus B with holder separator 26, where suspended matter 32 including crude refuse 48 and others is isolated through suspended matter-collecting shelf-like trap 27, and thence suspended matter 32 isolated is withdrawn therefrom and is transferred as shown by dashed line 32E for treatment T (simple treatment) or transferred to reservoir-separator 34 as shown by a continuous line 32U for additional treatment thereto (general treatment). As for purified water S after separated from crude refuse 48 and other suspended matter 32, it is simply discharged over discharge weir 29.

In liquid treating apparatus C with reservoir-separator 34, liquid 33 is temporarily stored to precipitate sediment 39 and suspended matter 38, 15, or 32; supernatant purified water S is discharged via pipe 40 and pump P as shown by the continuous line in the drawing; and sediment 39 and suspended matter 38, 15 or 32 together with the resultant liquid are withdrawn by means of pump P and are subjected to treatment T. In this manner, continuous liquid treatment can be carried out. This continuous treatment may be preferably used when a large quantity of such sediment 38, 15 or 32 are involved.

Second Continuous Liquid Treatment

With reference to FIG. 5 to FIG. 8, a second continuous liquid treatment and its method for continuous liquid treatment will be explained. Liquid treating apparatus B with holder-separator 26 and liquid treating apparatus C with reservoir-separator 34 are combined in this order and to this combination is supplemented liquid treating apparatus A with rotary separator 1 to constitute the second arrangement for continuous liquid treatment.

Further, the methods for continuous liquid treatment as mentioned below can be arranged for liquid 4 employing the continuous liquid treating apparatus.

Figure 5:
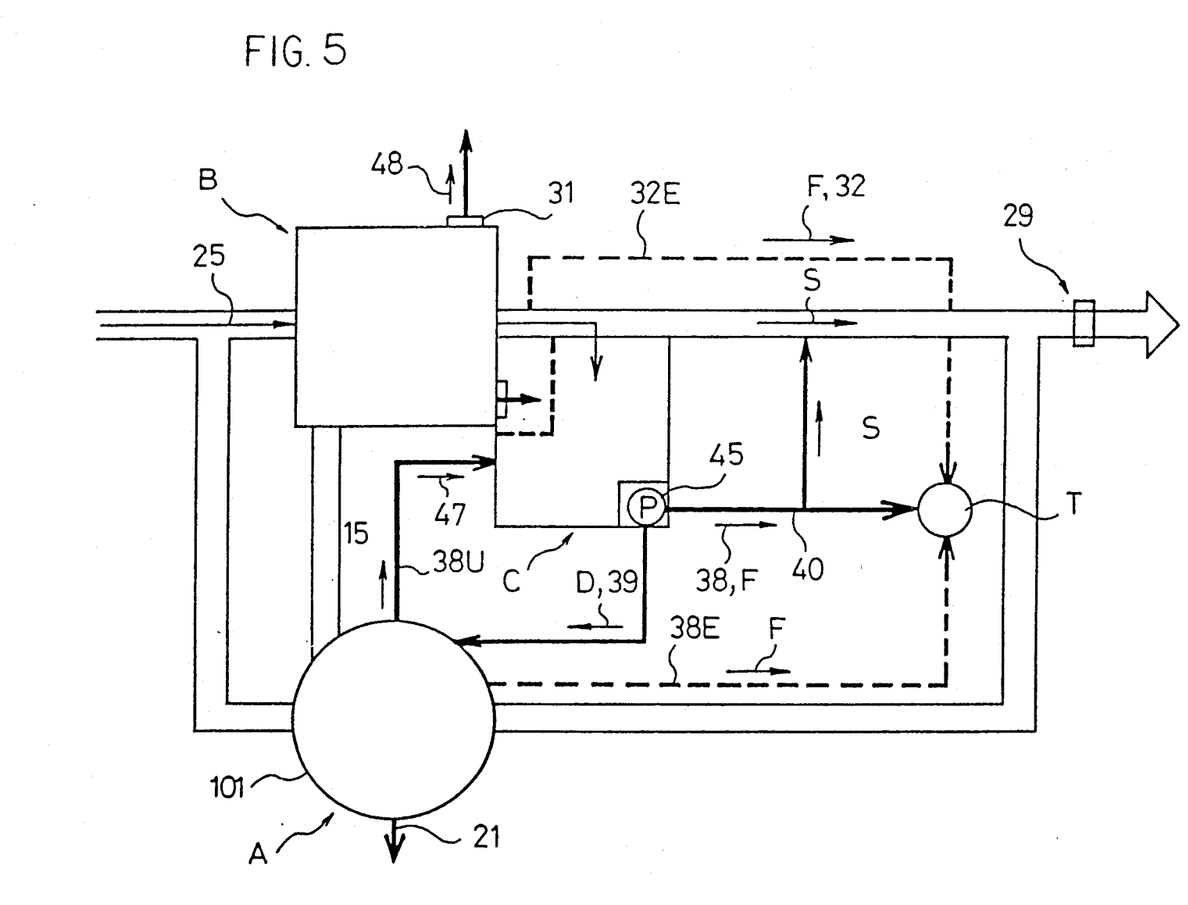
FIG. 5 shows a general process diagram for explaining a second continuous liquid treatment.
Figure 6:
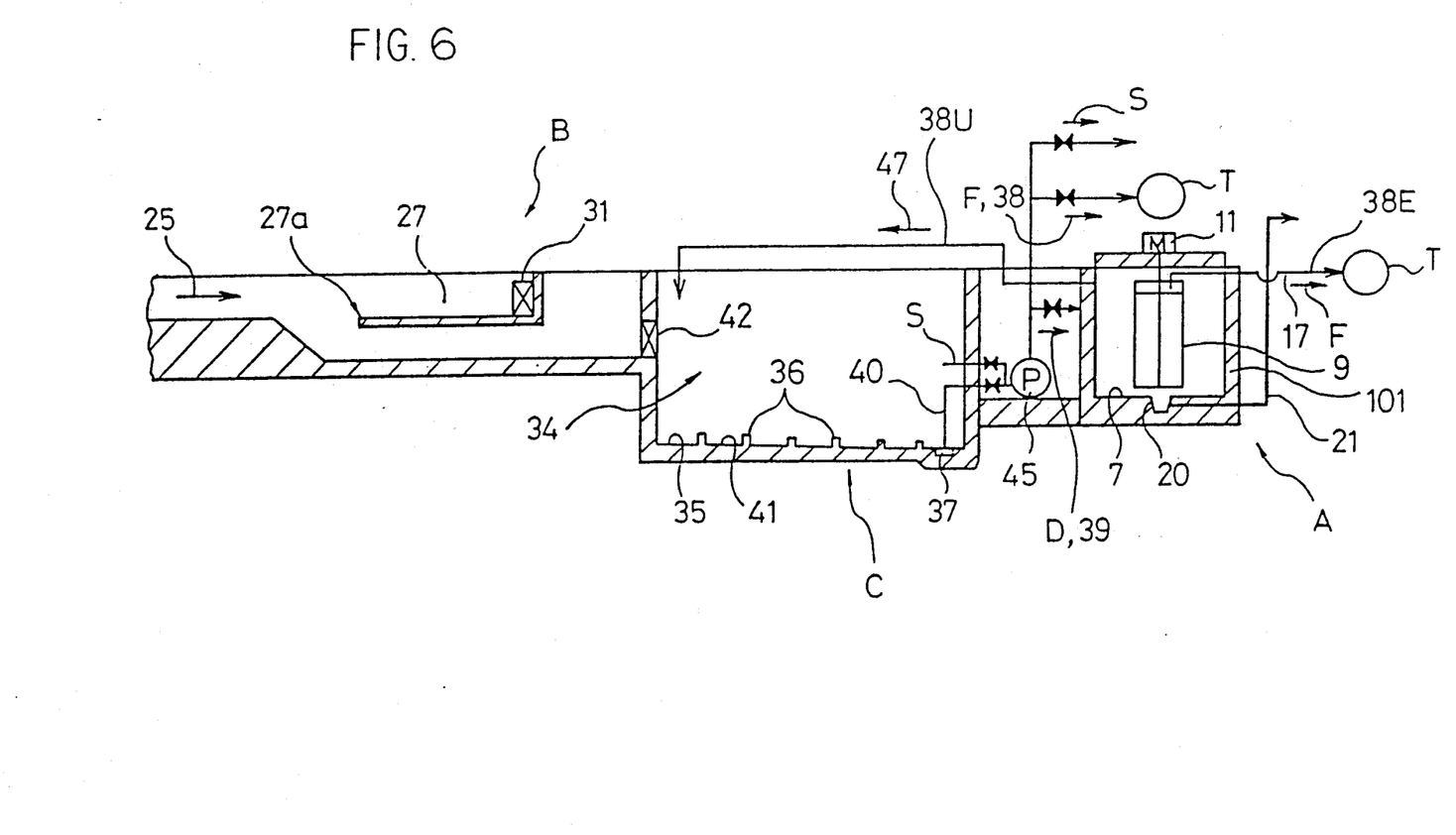
FIG. 6 shows a sectional view of an overall arrangement for schematically explaining the connecting condition of each liquid treating apparatus used for carrying out the second continuous liquid treatment illustrated in FIG. 5.

Liquid 25 is first introduced to liquid treating apparatus B with holder-separator 26 or 126 where crude refuse 48 and other suspended matter 32 are separated through suspended matter-collecting shelf-like trap 27 and are respectively withdrawn for disposal, while supernatant purified water S after separated is simply discharged over discharge weir 29 (when a less amount of sediment 39 is contained) or is introduced to liquid treating apparatus C with reservoir-separator 34 or 134 (when a larger amount of sediment 39 is contained).

In this liquid treating apparatus C, sediment 39 or D is precipitated, and, by means of pump P and pipe 40, supernatant purified liquid S is discharged and sediment 39, D precipitated is introduced together with the resultant liquid to treating apparatus A with rotary separator 1. Here, if suspended matter 38 or F is settled, it is withdrawn by means of pump P and pipe 40 and is subjected to treatment T in the same manner as above.

In liquid treating apparatus A, sediment 39 or D is forced by the revolution of rotating cylinder 9 to be collected in sediment well 20 formed in the central portion of bottom 7 of the separator and is withdrawn therefrom. When suspended matter 38 or F is intermingled with sediment 39 or D, it is forced by the revolution of rotating cylinder to be collected in suspended matter-collecting reservoir 13 formed in rotating cylinder 9 and, thence, is withdrawn as shown by a dashed line 38E for treatment T (simple treatment) or withdrawn as shown by a continuous line 38U and again introduced to liquid treating apparatus C where the same treatment is repeated. In case no or very little, if any, suspended matter 38 or F is intermingled, the liquid introduced to liquid treating apparatus C as shown by continuous line 38U is purified water S which may per se be adopted as purified water 47 for cleaning bottom 35 of reservoir-separator 34 or 134.

It is desirable to use this type of continuous liquid treatment for treatment of liquid including a large amount of sediment 39 or D, or a large amount of rain water.

Third Continuous Liquid Treatment

Figure 9:
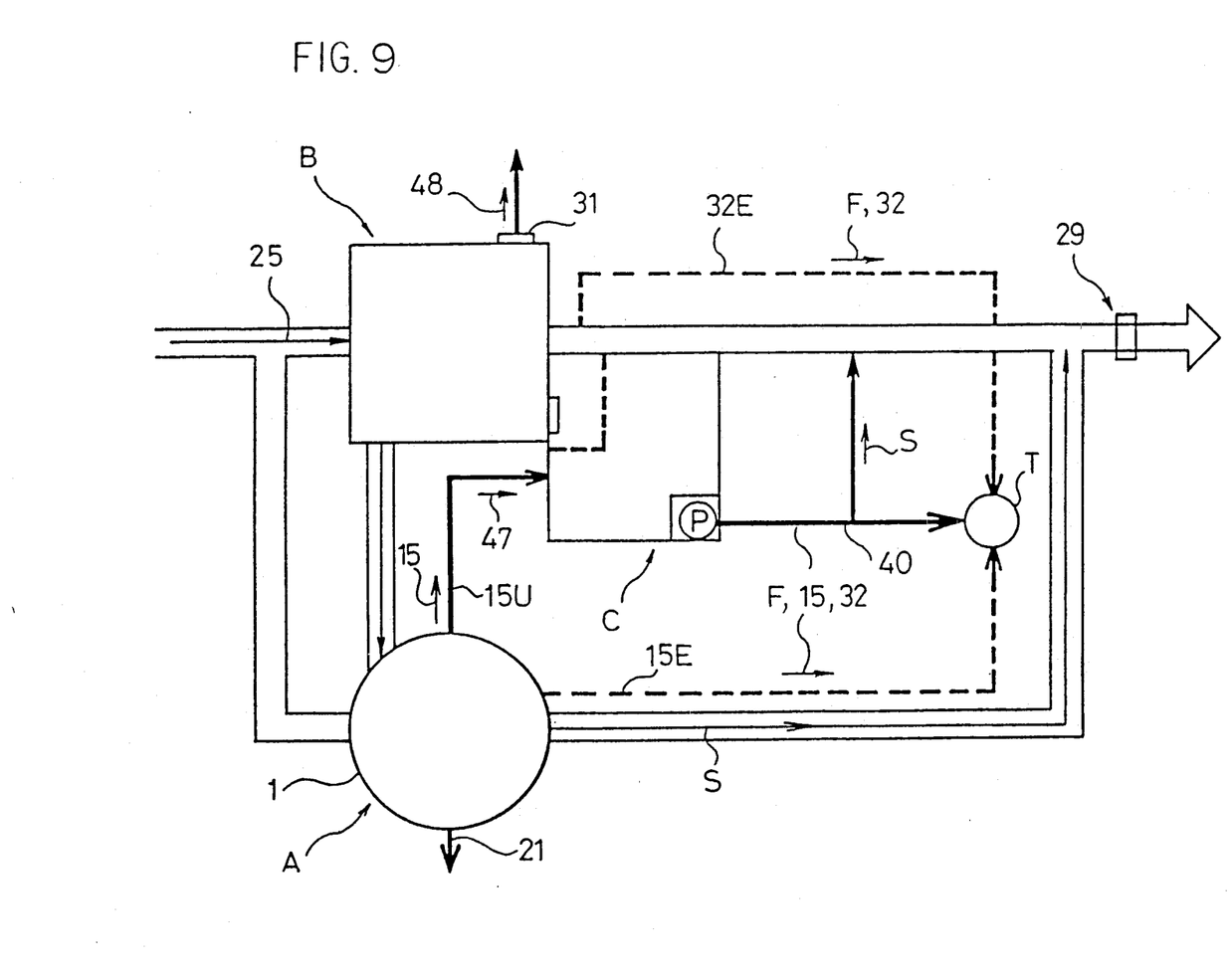
FIG. 9 shows a general process diagram for schematically explaining the third continuous liquid treatment.
Figure 10:
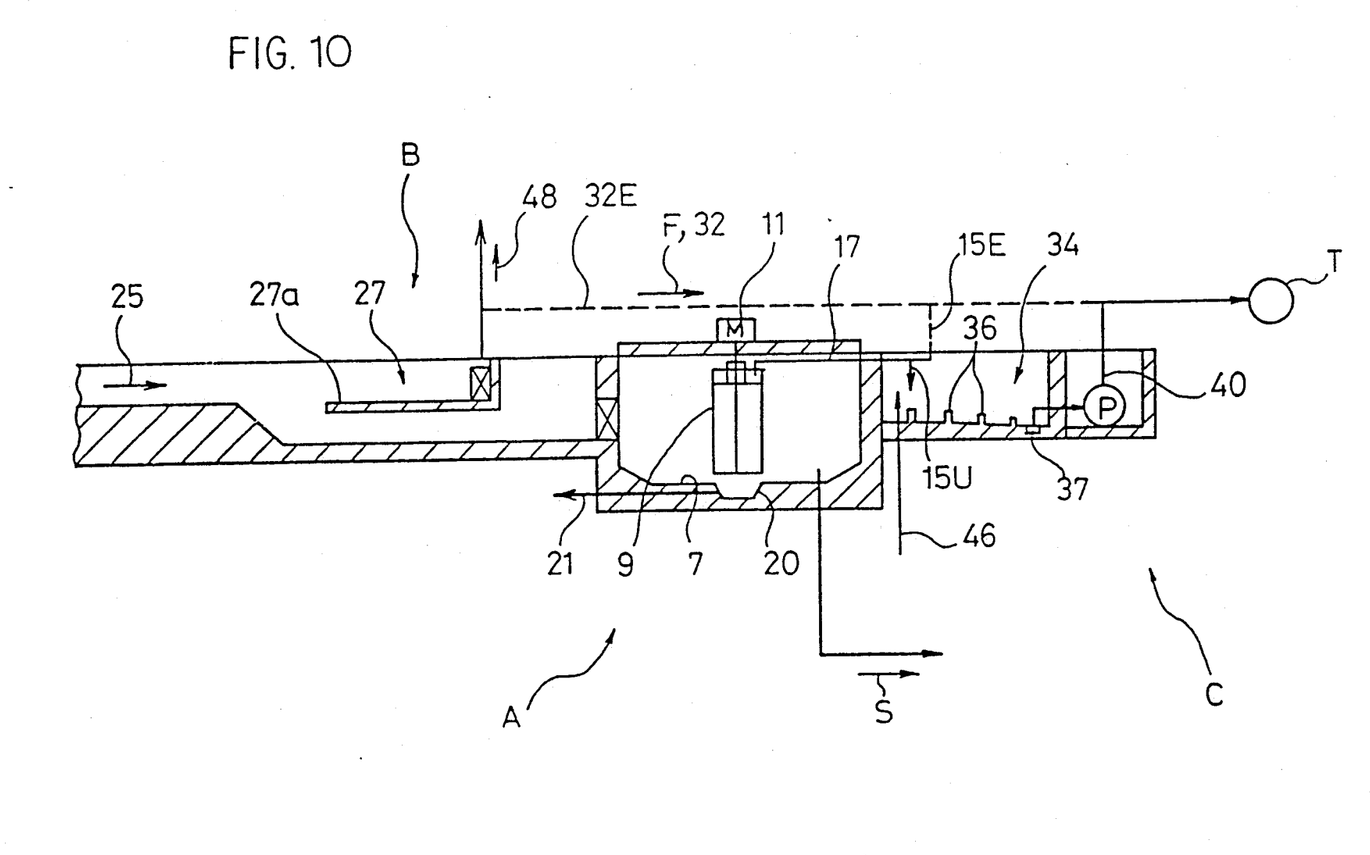
FIG. 10 shows a sectional view of an overall arrangement for schematically explaining the connecting condition of each liquid treating apparatus used for carrying out the third continuous liquid treatment illustrated in FIG. 9.

With reference to FIG. 9 and FIG. 10, a third continuous liquid treatment and method for continuous liquid treatment thereof will be explained. Liquid treating apparatus B with holder-separator 26 and liquid treating apparatus A with rotary separator 1 are combined in this order and to this combination is supplemented liquid treating apparatus C with reservoir-separator 34 to constitute the third arrangement for continuous liquid treatment.

The arrangement of this continuous liquid treatment is used to treat liquid 25 according to the following method for continuous liquid treatment.

Liquid 25 is first introduced to liquid treating apparatus B with holder-separator 26 where crude refuse 48 and suspended matter 32 are separated through suspended matter-collecting shelf-like trap 27 and is respectively withdrawn therefrom for disposal. Dashed line 32E is illustrative of the withdrawal of suspended matter 32 (simple treatment).

The liquid isolated from crude refuse 48 and suspended matter 32 is next directed to liquid treating apparatus A with rotary separator 1 where rotating cylinder revolves to cause suspended matter F, 15, or 32 to be separated from liquid and thereby to be collected in suspended matter-collecting reservoir 13 of rotating cylinder 9, and collected suspended matter F, 15, or 32 is withdrawn as show by dashed line 15E for treatment T. Sediment 6 or D is collected in sediment well 20 formed in the central portion of separator bottom 7 and is withdrawn therefrom, while purified water S is discharged. The resultant liquid containing suspended matter F, 15, or 32 is transferred to liquid treating apparatus C as shown by continuous line 15U and treated in the same manner as above. Suspended matter F, 15, or 32 separated is withdrawn via pipe 40 from the separator for treatment T, while purified water S is discharged. If suspended matter F, 15, or 32 contained in the liquid is nonexistent or very little, if any, the liquid introduced to liquid treating apparatus C as shown by continuous line 15U is purified water S which may per se be adopted as purified water 47 for cleaning bottom 35 of reservoir-separator 34.

This continuous treatment is adaptable for separating and withdrawing suspended matters and sediment respectively.

FIELD OF INDUSTRIAL APPLICATION

The present invention has the specific features as outlined above. That is, in the liquid treating apparatus with the rotary separator, the dual flow, e.g. the circular flow, the secondary flow, is positively and is forcedly produced to generate a strong eddy flow within liquid, thereby creating a reduced pressure and providing suspended matter and other materials in the separator with a centripetal force. The suspended matter can be consequently separated for withdrawal in an efficient manner through the suspended matter-collecting reservoir formed in a specified position of the rotating cylinder or side wall of the separator, while sediment can efficiently be separated and is withdrawn through settling and accumulation in the sediment well formed on the bottom of the separator.

Further, in the liquid treating apparatus using the holder-separator provided with the suspended matter-collecting shelf-like trap disposed with its opening opposite to the direction of a liquid flow, the suspended matter is carried by the liquid flow and automatically collected in the suspended matter-collecting trap in an accumulative manner, if a liquid level is always adjusted to the height of the shelf part of the suspended matter-collecting trap. Then, the suspended matter can effectively be separated and removed therefrom.

Still further, with the liquid treating apparatus with the reservoir-separator provided with the conductive and dividing wall and the bottom having a slope, the suspended matters or sediment, or both is temporarily stored therein, while it is settled and precipitated and a supernatant is discharged as purified water. After stored, the sediment or suspended matters, or both can be removed from the separator for treatment. The liquid treating apparatus thus functions as a reservoir which can be cleaned with ease and also as a precipitation separator.

Also, in this invention, the above apparatuses are selectively combined and connected to constitute the continuous liquid treating arrangements where suspended matters or sediment, or both is withdrawn in a more efficient manner. The suspended matters or sediment, or both can be efficiently withdrawn according to treating conditions such as a quantity of sediment or suspended matter, or both, a quantity of liquid, or kinds of liquids, e.g. liquid involving a large amount of sediment which may appear after heavy rain.

What is claimed is:

1. A liquid treating apparatus for settling and separating solid matters by circulating a liquid in a separator where the liquid subject to treatment is freely charged and discharged, said apparatus comprising a rotary separator having a liquid inlet, an outlet for treated liquid and a rotating cylinder having a base, and an upper end adapted to be adjacent a surface of the liquid during said treatment, with said rotating cylinder provided with a reservoir for collecting suspended matters, said reservoir being situated on said rotating cylinder adjacent the upper end of the cylinder, with said reservoir being below the surface of the liquid during said treatment, said rotating cylinder being freely revolved and being disposed in the central portion of said separator, wherein when said liquid is charged through said liquid inlet into circulation within said separator, the flow path of said circulating liquid in said separator is substantially around said rotating cylinder with a first circular flow around said rotating cylinder, said rotating cylinder generating a secondary strong eddy flow in the central portion of said separator by the revolution of the cylinder itself to create a reduced pressure, said secondary flow being directed toward said rotating cylinder, thereby settling and separating said solid matters and allowing suspended matters and others except for said liquid in separator to have a centripetal force, whereby said solid matters and suspended matters are drawn toward the center of the separator, with said settled solid matters being collected adjacent the base of the cylinder, said suspended matters being collected in the reservoir, and said treated liquid is discharged through said liquid outlet.

* * * * *

UNITED STATES PATENT AND TRADEMARK OFFICE
CERTIFICATE OF CORRECTION

PATENT NO. : 5,246,583
DATED : September 21, 1993
INVENTOR(S) : Tetsuo Nishida It is certified that error appears in the above-identified patent and that said Letters Patent is hereby corrected as shown below:

ON THE TITLE PAGE:

PCT Filing Date is October 11, 1989.

At Column 2, Line 28; change "other" to "others".

At Column 2, Lines 29-30; omit "Said separator causing the liquid with centripetal force."

At Column 7, Line 16; change "where" to "were".

Signed and Sealed this

Twenty-first Day of June, 1994

*Attest:*

BRUCE LEHMAN

*Attesting Officer*    *Commissioner of Patents and Trademarks*